United States Patent [19]

Black

[11] 4,021,929
[45] May 10, 1977

[54] CONTROLLED CROP DRYING ATTACHMENT FOR COMBINE

[76] Inventor: Glen N. Black, Rte. 1, Box 210, Osage City, Kans. 66523

[22] Filed: Apr. 2, 1975

[21] Appl. No.: 564,429

[52] U.S. Cl. .................................. 34/54; 34/86; 56/12.2
[51] Int. Cl.² ...................................... F26B 21/12
[58] Field of Search ............ 60/597; 34/13, 20, 30, 34/66, 86, 35, 54, 232; 56/12.2; 165/43

[56] References Cited

UNITED STATES PATENTS

| | | | |
|---|---|---|---|
| 1,658,775 | 2/1928 | Campbell | 34/86 |
| 2,200,379 | 5/1940 | Williams | 34/86 |
| 2,343,345 | 3/1944 | Touton | 34/233 |
| 2,777,212 | 1/1957 | McOmber | 34/86 |
| 3,096,165 | 7/1963 | Lane | 34/86 |
| 3,388,549 | 6/1968 | Spencer et al. | 60/597 |

FOREIGN PATENTS OR APPLICATIONS

| | | | |
|---|---|---|---|
| 784,861 | 10/1957 | United Kingdom | 34/174 |
| 936,577 | 9/1963 | United Kingdom | 56/12.2 |

Primary Examiner—John J. Camby
Assistant Examiner—Larry I. Schwartz
Attorney, Agent, or Firm—Fishburn, Gold & Litman

[57]. ABSTRACT

A heat exchanger is mounted to the combine and receives waste heat from the combine engine. A blower is mounted to the combine and sucks ambient air through the heat exchanger to heat the air and blows the heated air into a closed end duct that has a portion mounted in the combine crop hopper. The portion of the closed end duct mounted in the crop hopper has a plurality of perforations therein so that the heated air can dry the combined crops. An apparatus is provided for controlling the temperature of the air blown into the combined crops including a damper for supplying a desired mixture of ambient air and heated air to the closed end duct. A transducer mounted in the closed end duct and a transducer responsive damper actuating apparatus moves the damper in response to the transducer response to the temperature of the air passing the transducer. The transducer responsive damper actuating apparatus is shown as a mechanical, pneumatic and electrical apparatus.

10 Claims, 10 Drawing Figures

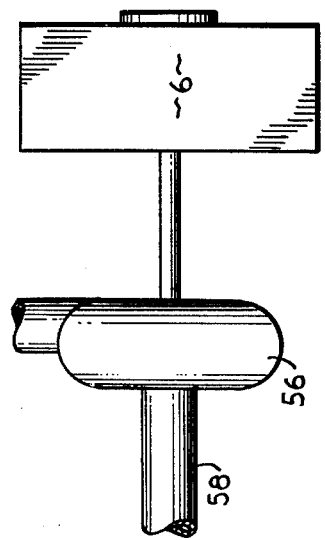
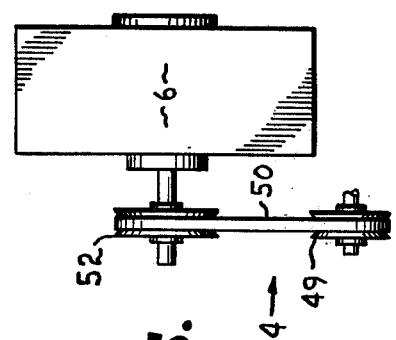
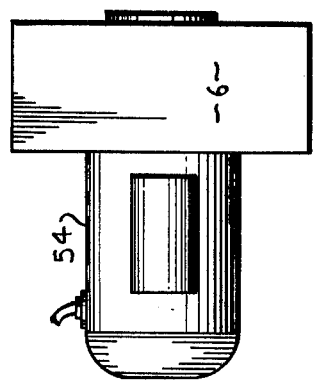

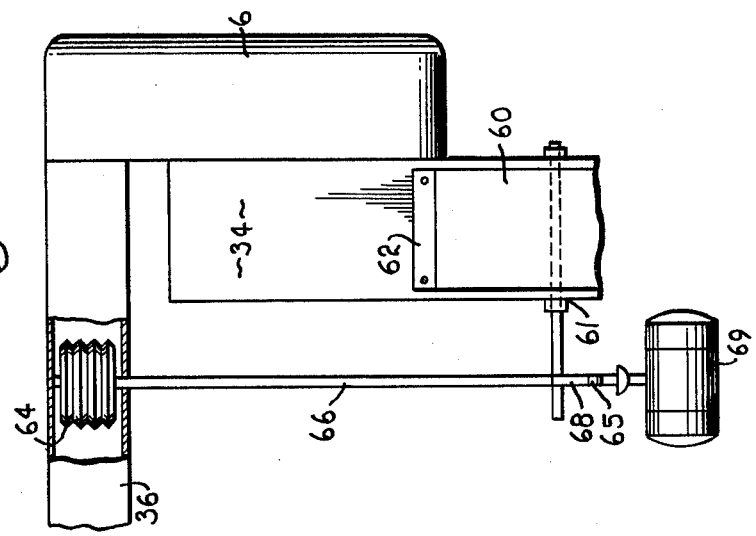
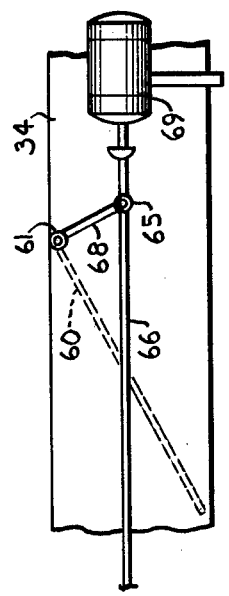

CONTROLLED CROP DRYING ATTACHMENT FOR COMBINE

BACKGROUND OF THE INVENTION

This invention relates to a controlled, crop drying attachment for a combine.

It is old to use waste heat from a crop harvesting apparatus to help dry the crop being harvested. Wast heat and auxilliary heat have been used to internally heat drums or cylinders through which the harvested crop was passed. In one instance exhaust gases were blown directly on the harvested crop as the crop was blown toward the hopper, and in another case air is sucked over a generator internal combustion engine and blown into the harvested crop before the harvested crop is transported to a hopper.

However, none of the prior art shows the drying means as an attachment for a combine and utilizing combine engine waste heat. Also, none of the prior art shows using a heat exchanger to heat clean, ambient air with engine waste heat wherein the heated ambient air is blown directly into the crop. None of the prior art shows drying of the harvested crop in a hopper with engine waste heat. And, importantly, none of the seen references even remotely suggests automatically adjusting the hot air and ambient air mixture ratio being delivered to the harvested crop, let alone the details disclosed by the present invention for providing automatic adjustment.

A problem solved by this invention is that a crop drying attachment for a combine is provided that is an attachment for a combine.

Another problem solved by this invention is that a crop drying attachment for a combine is provided that utilizes a heat exchanger to supply clean, heated ambient air to dry the crop.

Another problem solved by this invention is that a crop drying attachment for a combine is provided wherein the combined crop is dried in a hopper.

Another problem solved by this invention is that a crop drying attachment for a combine is provided that has an automatic adjusting of the temperature of the drying air supplied to the combined crop in the combine hopper to control the combined crop drying rate.

Another problem solved by this invention is that a crop drying attachment for a combine is provided that is compact.

Another problem solved by this invention is that a crop drying attachment for a combine is provided that cools the combined crops after drying the combined crop.

Another problem solved by this invention is that a crop drying attachment for a combine is provided wherein the air required to dry the crop is completely independent of the combining process.

Another problem solved by this invention is that a crop drying attachment for a combine is provided that does not interfere with the threshing or operating of the combine in any way.

Another problem solved by this invention is that a crop drying attachment for a combine is provided that performs a needed function with a minimum of investment.

Another problem solved by this invention is that a crop drying attachment for combine is provided that uses no external source of energy.

Another problem solved by this invention is that a crop drying attachment for a combine is provided that can be installed with a minimum of skill and training.

SUMMARY OF THE INVENTION

A heat exchanger is mounted to the combine and receives waste heat from the combine engine. A blower is mounted to the combine and sucks ambient air through the heat exchanger to heat the air and blows the heated air into a closed end duct that has a portion mounted in the combine crop hopper. The portion of the closed end duct mounted in the crop hopper has a plurality of perforations therein so that the heated air can dry the combined crops. An apparatus is provided for controlling the temperature of the air blown into the combined crops including a damper for supplying a desired mixture of ambient air and heated air to the closed end duct. A transducer mounted in the closed end duct and a transducer responsive damper actuating apparatus moves the damper in response to the transducer response to the temperature of the air passing the transducer. The transducer responsive damper actuating apparatus is shown as a mechanical, pneumatic and electrical apparatus.

BRIEF DESCRIPTION OF THE DRAWINGS

FIG. 4 is a schematic diagram of an electric motor means of driving the blower;

FIG. 5 is a schematic diagram showing a pulley and belt take off from the combine drive transmission means for driving the blower;

FIG. 6 is a schematic diagram showing a gas turbine means for driving the blower;

FIG. 7 is a schematic partially showing the mechanical means for controlling the temperature of the air blown into the combined crop in the hopper;

FIG. 8 is another schematic diagram of the mechanical means for controlling the temperature of the air blown into the combined crops in the hopper;

DESCRIPTION OF THE PREFERRED EMBODIMENT

Figure 1:
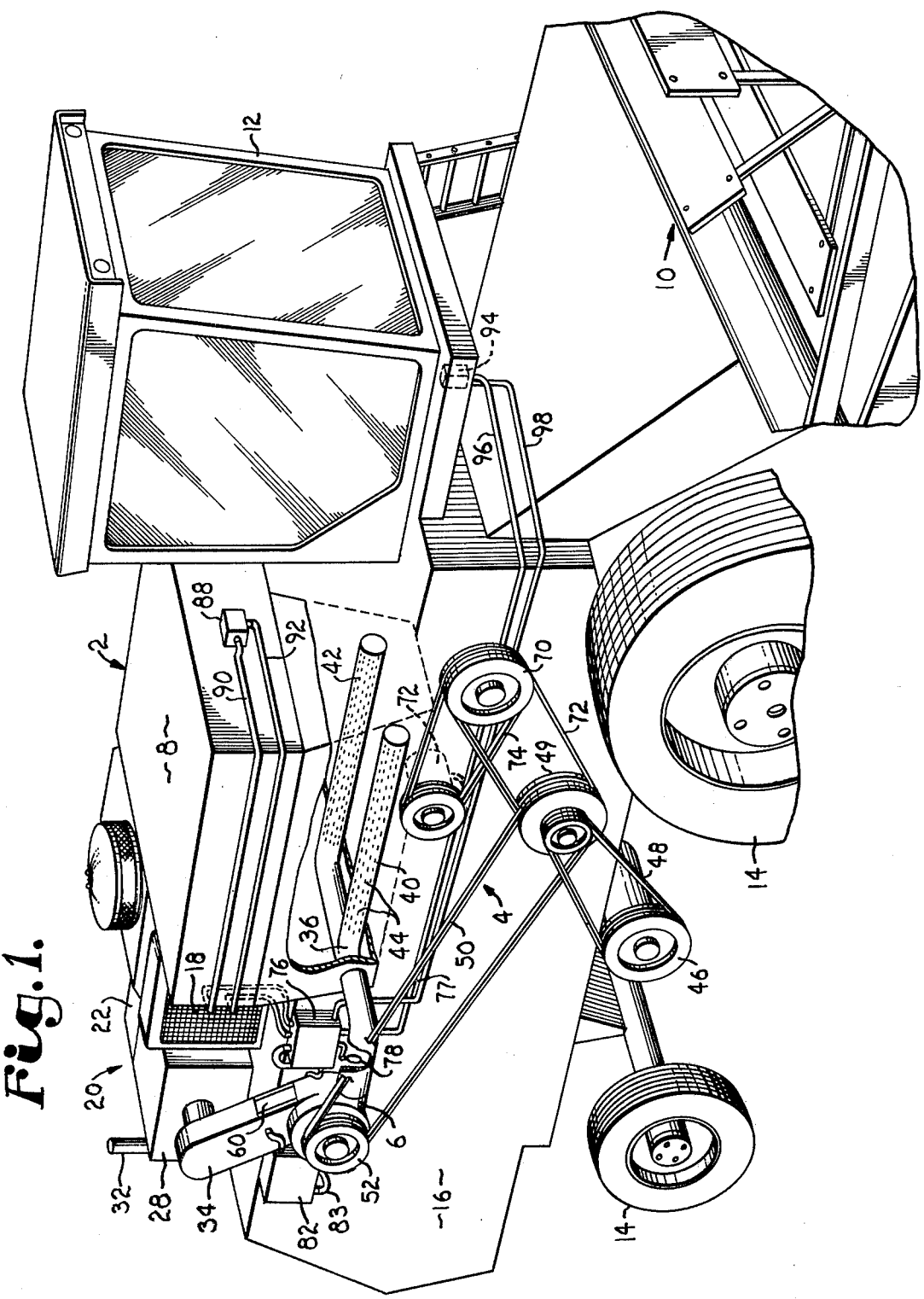
FIG. 1 is a partial, partially cut away perspective view of a combine with a controlled, pneumatic, crop drying attachment.

Referring generally to FIGS. 1, 2, 3, and 5, a combine 2 having a crop drying attachment using the pulley and belt take off means 4 for driving the blower 6 and a pneumatic means for controll the temperature of the air blown into the hopper 8 is shown. The combine 2 has the usual cutting apparatus 10, cab 12, wheels 14, and body 16. The combine 2 has a combine engine 18 for providing power to drive and operate the combine 2. A heat exchanger 20 is mounted to the combine 2. The heat exchanger 20 has two sections including an engine coolant liquid heat exchanger 22 for receiving combine engine 18 engine coolant liquid through conduit 24 and conduit 26. Thus, engine coolant system liquid is circulated through the heat exchanger 22 so that engine 18 waste heat may be used to heat ambient air as will later be described. The heat exchanger 20 also has an engine exhaust gas heat exchanger 28 through which engine 18 exhaust gas is forced through inlet conduit 30 and exhaust conduit 32. Thus, engine exhaust gas is used to supply engine waste heat to heat exchanger 28 to heat ambient air as will later be described. Now it may be seen that either engine coolant system liquid or engine exhaust gas or both may be used to supply engine waste heat to the heat exchanger 20. Blower 6 is mounted to the combine 2 and is operatively connected on the input side to the heat exchanger 22 by means of duct 34. A closed end duct 36 is operatively connected to the output side of the blower 6 to receive air from the blower 6. Closed end duct 36 has a portion mounted within the combine harvested crop hopper 8. The portion mounted within hopper 8 has a leg 40 and a leg 42. Legs 40 and 42 have a plurality of perforations 44 so that air blown into the legs by the blower 6 can escape into the combined crop in the hopper 8 to dry the combined crop. Now it can be seen that ambient air can be sucked through the heat exchanger 20 by the blower 6 whereby the ambient air is heated by the engine coolant system liquid waste heat or the engine exhaust gas waste heat or both. The heated air is sucked through duct 34 and blown by the blower 6 into the closed end duct 36 where the heated air passes through the perforations 44 into the combined crop(not shown) in the hopper 8 whereby the combined crops are dried by the engine waste heat. The perforations 44 must be large enough to readily pass the heated air but small enough to prevent crops(such as wheat) from entering into the legs 40 and 42 through the perforations 44. Thus, waste heat from the combine engine 18 is used to dry the crops harvested by the combine.

Figure 2:
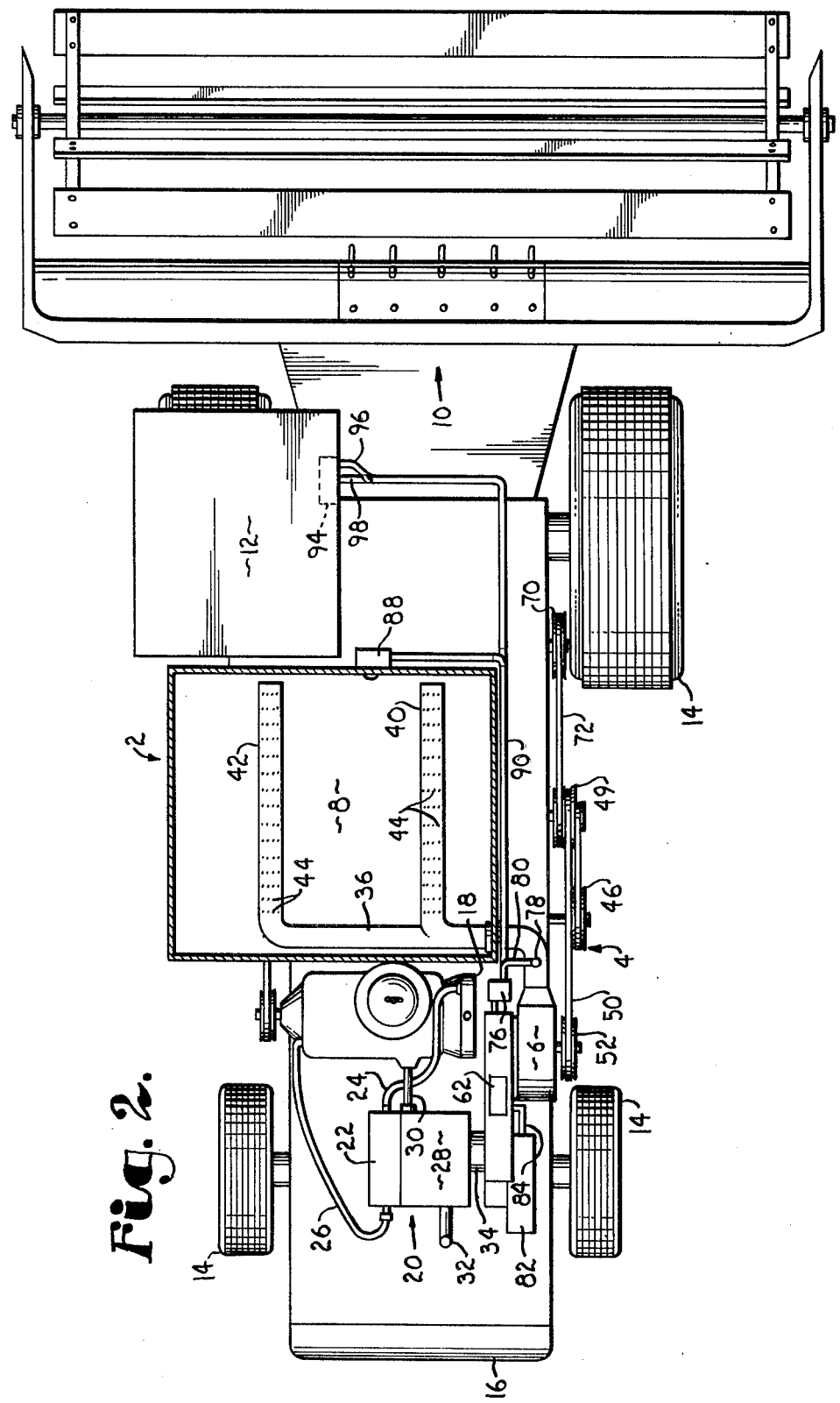
FIG. 2 is a top view, partially cut away of a controlled, pneumatic, crop drying attachment; on a combine.
Figure 3:
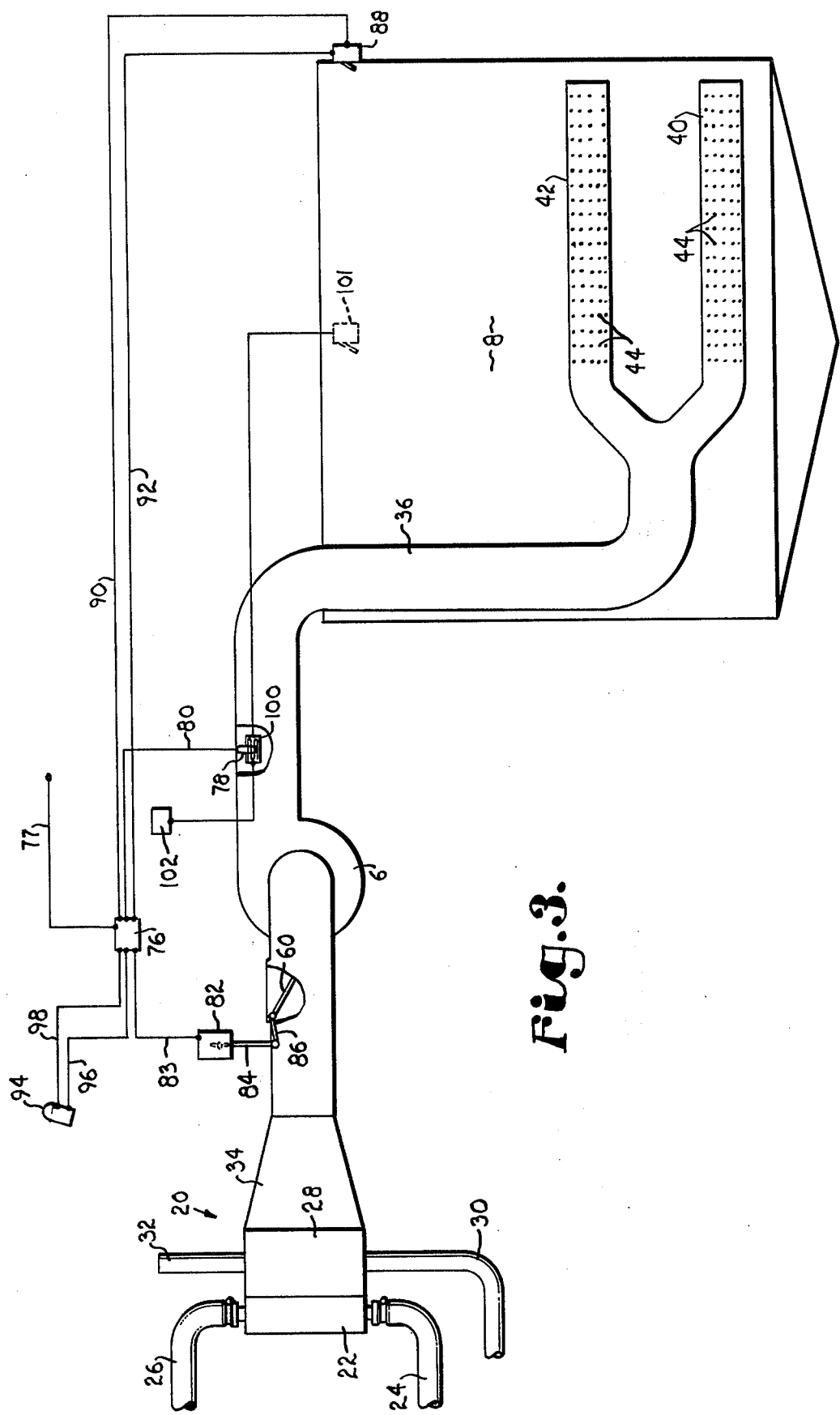
FIG. 3 is a schematic diagram of the pneumatic means for controlling the temperature of the air blown into the combined crops in the hopper.

Various means could be used to drive the blower 6. FIGS. 1, 2, and 5 show a pulley and belt take off means for driving the blower 6. A pulley 46 is driven by the combine power transmission system. A belt 48 from the pulley 46 drives triple pulley 49. A belt 50 from triple pulley 49 drives pulley 52 which is operatively connected to the drive shaft of the blower 6. Thus, the blower 6 is driven by the combine power transmission system.

The blower 6 could also be driven by an electric motor 54 as shown in FIG. 4. The blower 6 could also be driven by a gas turbine 56 connected to the combine engine 18 exhaust by conduit 58 as shown in FIG. 6. Many apparatuses could be used to drive the blower 6.

The mechanical means used to control the temperature of the heated air blown into combine hopper 8 will now be described. See FIGS. 7 and 8. Referring to FIGS. 7 and 8 a damper 60 is pivotally mounted to the duct 34 at 61 and moves between a position closing an opening 62 in the duct 34 and shutting out ambient air and a position blocking flow through the duct 34 and allowing ambient air to flow into the duct 34 through opening 62. An expandable, gas filled sensor 64 is mounted in the closed end duct 36 and is connected to the damper 60 by means of link 66 and link 68. Link 66 extends through the closed end duct 36 through an opening having a seal. The lengths of link 66 and link 68 may be changed to control and change the response of damper 60 to the expansion and contraction of sensor 64. As can be seen, when the gas in sensor 64 expands, the sensor 64 expands and opens the opening 62 with damper 60 and when the gas in sensor 64 contracts the sensor 64 contracts and closes opening 62 to ambient air. Thus, as the air temperature to the hopper 8 increases, the opening 62 is opened to ambient air and as the temperature of the air to hopper 8 decreases the opening 62 is closed to ambient air thus controlling the temperature of the hot air to the hopper 8. A solenoid 69 is mounted to the combine 2 and is connected to the links 66 and link 68 at joint 65 and is strong enough to overide the gas filled sensor 64 and open the damper 60 and let ambient air into the hopper 8 as the crop in the hopper 8 approaches to top of the hopper 8. The solenoid 69 is activated by a manual switch (not shown) mounted in the cab 12 and electrically connected to the solenoid 69 or a binlevel electric solenoid switch (not shown) mounted in the hopper 8 at a predetermined level and electrically connected to the solenoid 69 to energize it when the crop reaches a predetermined level in the hopper 8. Thus, it can be seen that as the temperature of the air to the hopper 8 goes up more ambient cooler air is admitted to the hopper 8 and as the temperature of the air to the hopper 8 lowers, less ambient air is admitted to the hopper 8 thus controlling the temperature of the air to the hopper 8 by the described mechanical means.

The pneumatic means for controlling the temperature of the air to the hopper will now be described. See FIGS. 1, 2 and 3 for the pneumatic control means. As can be seen in FIG. 1, triple pulley 49 drives pulley 70 with belt 72. Pulley 70 drives compressor 72 with belt 74. Compressor 72 pumps compressed air to pneumatic control relay 76 through conduit 77. Pneumatic control relay 76 is a diaphram type pressure regulator. A pneumatic sensor bulb 78 is mounted in the closed end duct 36 and pneumatically connected to the pneumatic control relay 76 by conduit 80. A pneumatic activator cylinder 82 is mounted to the combine 2 and operably and pneumatically connected to control relay 76 by conduit 83 and actuates damper 60 by means of links 84 and 86 connected between the damper 60 and the actuator cylinder 82. Expanding gas in sensor bulb 78 creates pressure when heated by the passing of heated air. The control relay 76 responds to the pressure of the gas in the sensor bulb 78 and allows more or less air pressure from the air compressor 72 to reach pneumatic actuator cylinder 82 by conduit 83 which overcomes or yields to the spring pressure in the actuator cylinder 82 which positions damper 60 accordingly. The actuator cylinder 82 is an ordinary one way, spring type air cylinder or it could be a single acting diaphram type cylinder. Thus, when the temperature of the air passing the bulb 78 goes up the damper 60 is moved to allow more ambient air to enter the opening 62 and as the temperature of the air passing the sensor bulb 78 goes down the damper 60 is moved to close the opening 62 to ambient air. Thus, the pneumatic control system controls the temperature of the air to the hopper 8. For opening the opening 62 to ambient air with damper 60 when the crop is approaching the top of the hopper 8 to allow the crop to cool, a binlevel pneumatic control switch 88 is mounted in the hopper 8 and is pneumatically and operably connected by conduits 90 and 92 to the control relay 76 to cause the control relay 76 to actuate cylinder 82 when actuated by the crop reaching a predetermined level in the hopper 8. Also a pneumatic switch 94 is connected operably by conduits 96 and 98 to control relay 76 to cause control relay 76 to actuate actuator cylinder 82 and open opening 62 with damper 60. Pneumatic switch 94 is mounted in the cab 12 so that the cab operators can open opening 62 to allow the crop in the hopper 8 to cool when desired as when the hopper 8 is nearly full. An electrical means is also provided for opening the opening 62 as shown only in FIG. 3. The electrical means comprises a resistance heating element 100 surrounding the sensor bulb 78 and energizable by an electrical binlevel actuator switch 101 mounted in the hopper 8 at a predetermined level and actuated by the crop reaching a predetermined level in the hopper 8 and electrically and operably connected to the resistance heating element 100 and the combine 2 electrical supply means. The heating element 100 is also electrically and operably connected to an electrical manual switch 102 mounted in the cab 12 and the combine 2 electrical supply means so that the resistance heating element 100 may be energized from the cab. Thus, when the heating element 100 is energized by either the electrical binlevel switch 101 being actuated by the crop reaching a predetermined level in the hopper 8 or by the manual switch 102 in the cab 12 the heating element 100 heats up and simulates very hot air passing the sensor bulb 78 which will open opening 62 with damper 60 as described above. Thus, the temperature of the air to the hopper 8 crop is controlled pneumatically and by some electrical means.

Figure 9:
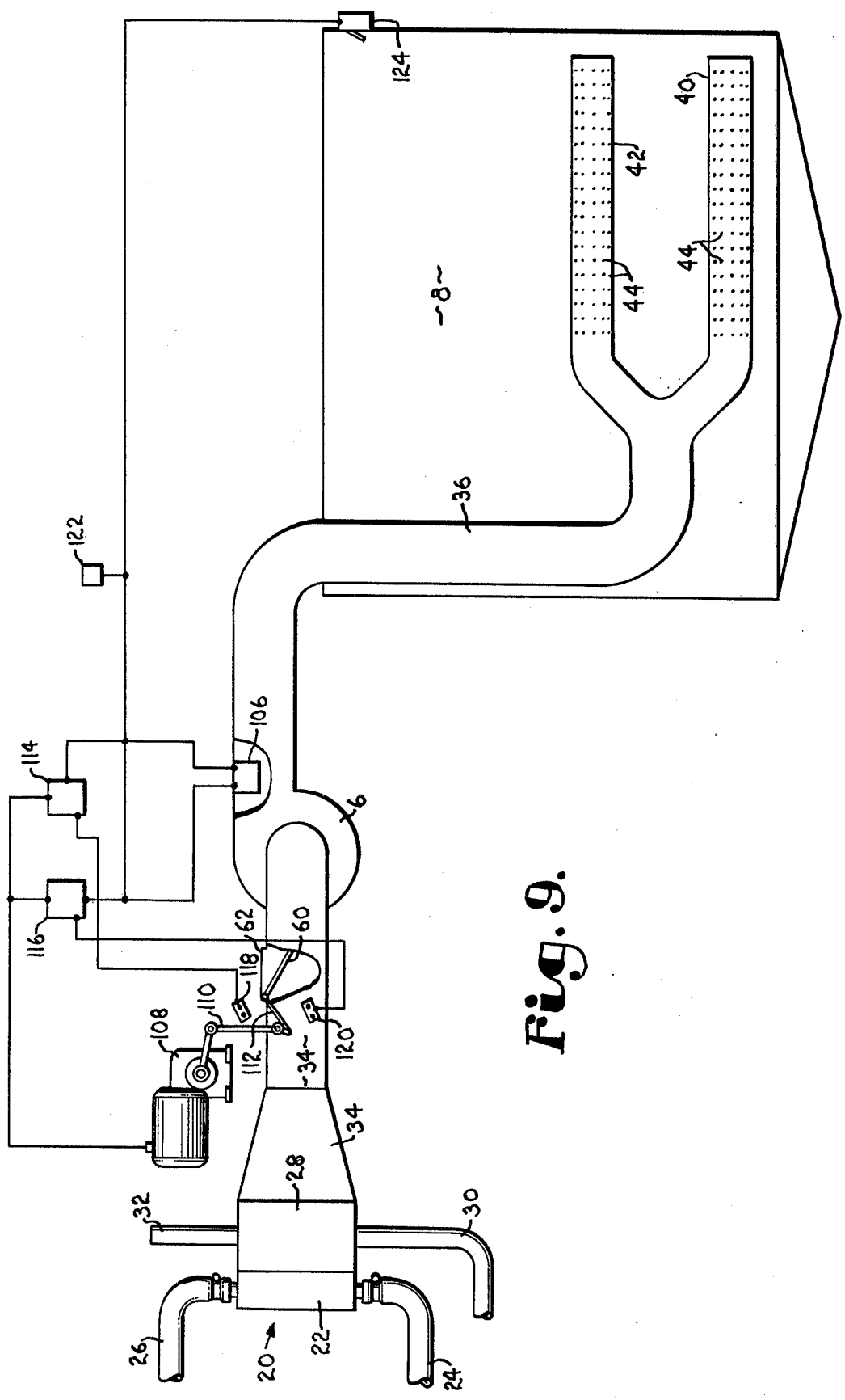
FIG. 9 is a schematic diagram of the electrical means for controlling the temperature of the air blown onto the combined crops in the hopper.

An electrical means is also provided for controlling the temperature of the air to the hopper 8 and will now be described. Refer to FIG. 9 where the electrical system will first be described. The system operates off the combine 2 electrical system. A temperature controller 106 is mounted in the closed end duct 36. The temperature controller 106 includes a bimetallic temperature sensing element (not shown) and a temperature rise switch and a temperature drop switch, the bimetallic element actuating the temperature rise switch when the temperature of the air passing the bimetallic element rises and the bimetallic element actuating the temperature drop switch when the temperature of the air passing the bimetallic element drops. A reversable electric motor 108, is mounted to the combine 2 and a linkage comprised of link 110 and link 112 connects the electric motor 108 to the damper 60 to move the damper 60 to open and close opening 62 to ambient air to control the temperature of air reaching the hopper 8. A motor reverse control relay 114 is electrically connected to the motor 108 and temperature rise switch to energize the motor in a reverse direction to open the damper 60 when the temperature of the air passing the bimetallic element in the temperature controller 106 rises. A motor forward control relay 116 is electrically connected to the motor 108, and the temperature drop switch in the temperature controller 106 to energize the motor 108 in a forward direction to close the damper 60 when the temperature of the air passing the bimetallic element in the temperature controller drops. A motor reverse limit switch 118 is mounted to the combine 2 and is actuated by the motor 108 linkage and is electrically connected to the motor reverse control relay 114 to deenergize and limit movement of the motor 108 in a reverse direction. A motor forward limit switch 120 is mounted to the combine 2 and mechanically actuable by the motor 108 linkage and electrically connected to the motor 108 forward control relay 116 to deenergize and limit movement of the motor 108 in a forward direction. Thus, the movement of the bimetallic element in the closed end duct 36 controls movement of the motor 108 to control the position of the damper 60 to control the temperature of the air to the hopper 8. A manual electric cooling switch 122 is mounted in the combine cab 12 and a binlevel electric cooling switch 124 is mounted in the hopper 8 at a predetermined level, the manual cooling switch 122 and binlevel cooling switch 124 being electrically connected in series with the temperature drop switch of the temperature controller 106 and motor forward relay 116 and parallel-series with the motor reverse relay 114 so that upon actuation of the manual switch 122 or actuation of the binlevel switch 124 by the crop reaching the predetermined level in the hopper 8, current is interrupted to the motor forward relay 116 and current is supplied to the motor reverse relay 114 to open the damper 60 to ambient air to supply ambient air to the combined crops in the hopper 8 to cool the combined crops before unloading the combined crops.

Figure 10:
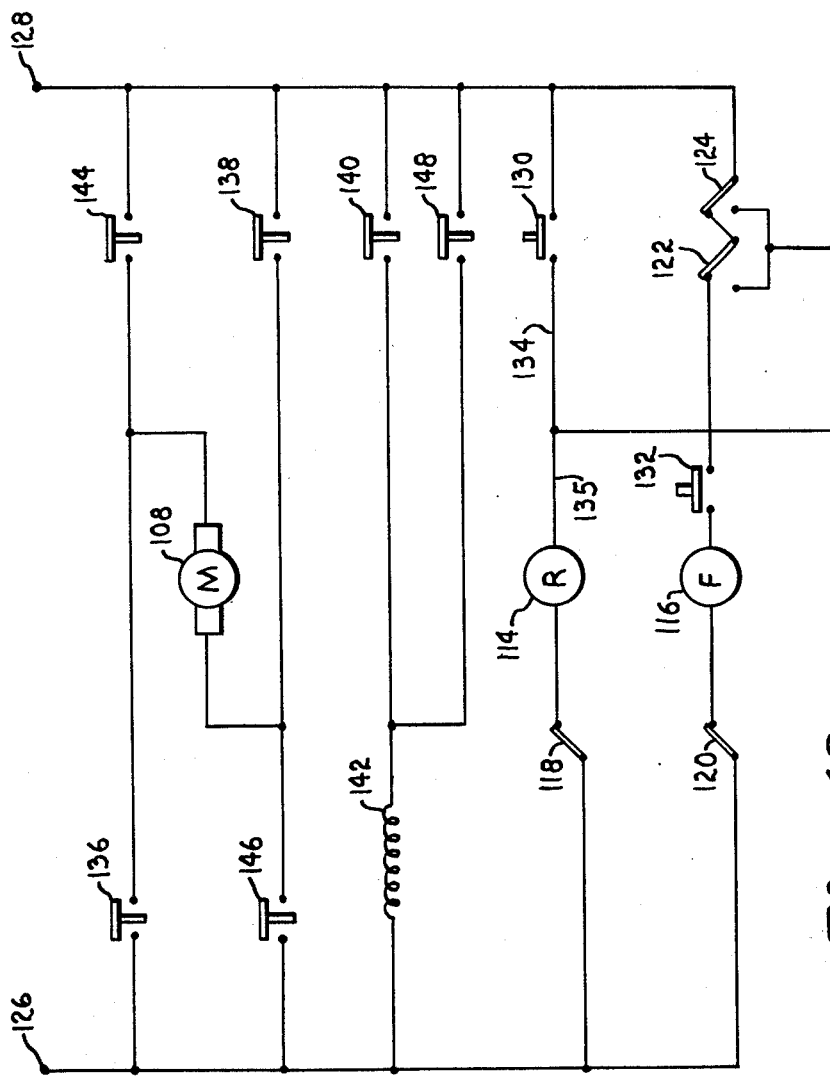
FIG. 10 is an electrical schematic diagram of the electrical control means for controlling the temperature of the air blown into the hopper using the electrical means.

Refer now to FIG. 10 where the same electrical temperature control system will be described in greater detail. Combine 2 electrical power is fed into terminals 126 and 128. The temperature controller 106, temperature rise switch 130 and temperature drop switch 132 are shown. When the temperature rise switch 130 is actuated by the bimetallic element it can be seen the motor reverse control relay 114 is energized through conductors which in turn closes relay switches 136, 138 and 140. It can be seen that closing relay switches 136, 138 and 140 energizes motor field coil 142 and motor 108 through conductors to move the motor 108 in the reverse direction. When the temperature drop switch 132 is actuated by the bimetallic element it energizes the motor forward control relay 116 through conductors which in turn closes relay switches 144, 146 and 148. Closing relay switches 144, 146 and 148 energizes the motor field coil 142 and motor 108 in the forward direction. Thus, as the temperature of the air passing the bimetallic element goes up the motor 108 is actuated in the reverse direction to open the damper 60 to allow cooler ambient air in. And when the temperature of the air passing the bimetallic element goes down the motor 108 is actuated in the forward direction to shut out cooler air with the damper 60. The bimetallic element is not shown. The motor reverse limit switch 118 limits movement of the motor 108 in the reverse direction and motor forward limit switch 120 limits movement of the motor 108 in the forward direction as described above. The manual electrical cooling switch 122 and binlevel cooling switch 124 are connected in series with the motor forward control relay 116 and in parallel-series with the motor reverse relay 114 so that if either the binlevel cooling switch 124 is actuated by the crop reaching its predetermined level in the hopper 8 or the manual cooling switch 122 is actuated by the combine 2 operator in the cab 12, it can be seen that current is supplied to the motor reverse relay 114 and interrupted to the motor forward control relay 116 to cause the motor 108 to move in reverse and open the damper 60 to cool the crop before unloading. The motor reverse limit switch 118 allows the damper to open substantially fully open. Thus, the electrical temperature control means controls the temperature of the air to the crop in the hopper 8.

It should be noted that sensor 64, sensor bulb 78 and temperature controller 106 are all transducers.

Also note that between the damper 60 and the transducers there are a mechanical, pneumatic and electrical transducer responsive damper actuating apparatus provided in the above description.

While I have shown and described a specific embodiment of the invention further modifications and improvement will occur to those skilled in the art. I desire it to be understood therefore that this invention is not limited to the exact form shown and described, and I intend in the appended claims to cover all the modifications which do not depart from the scope and spirit of the invention.

I claim:

1. A controlled crop drying attachment for a combine which comprises:
   a. a heat exchanger for mounting to the combine and operable connection to the combine engine for receiving waste heat therefrom;
   b. a blower for mounting to the combine, operatively connected to the heat exchanger, and sucking ambient air through the heat exchanger to heat the air;
   c. means for driving the blower; said driving means for mounting to the combine and operatively connected to the blower;
   d. a closed end duct for mounting to the combine and operatively connected to the blower to receive blower heated air therefrom, the duct having a portion thereof for mounting within a combine crop hopper, the portion mounted within the hopper having a plurality of perforations, whereby the blower blows the heated air through the perforations to dry the combined crops;
   e. means controlling the temperature of the air blown into the combined crops for controlling the drying thereof;
   f. said means controlling the temperature of the air blown into the combined crops in the hopper comprising:
      1. a heat exchanger duct having an opening to ambient air and connecting the heat exchanger with the blower;
      2. a damper pivotally mounted in the heat exchanger duct and movable between, and intermediate to, a position closing the opening and allowing a full flow of heated air through the duct, and a position fully opening the opening and blocking the heated air flow;
      3. a transducer mounted in the closed end duct;
      4. means for controlling the position of the damper in response to the temperature of the air flowing past the transducer; said controlling means being connected to the transducer and damper so that the ambient air and heated air mixture ratio is controlled, thereby controlling the temperature of the air blown into the combined crops in the hopper whereby the combined crop drying is controlled.

2. A controlled, crop drying attachment for a combine as recited in claim 1 wherein the means controlling the temperature of the air blown into the combined crops further comprises:
   a. a transducer responsive damper actuating apparatus for mounting to the combine and connected to the transducer and the damper for moving the damper in response to the temperature of the air flowing past the transducer, whereby the ambient air and heated air mixture ratio is controlled, thereby controlling the temperature of the air blown into the combined crops.

3. A controlled crop drying attachment for a combine as recited in claim 1 wherein the means controlling the temperature of the air blown into the combined crops in the hopper further comprises:
   a. an expandable, gas filled sensor mounted in the closed end duct; and
   b. a linkage connecting the expandable, gas filled sensor and the damper whereby expansion and contraction of the sensor opens and closes the damper.

4. A controlled crop drying attachment for a combine as recited in claim 1 wherein the means controlling the temperature of the air blown into the combined crops in the hopper further comprises:
   a. a pneumatic sensor bulb mounted in the closed end duct;
   b. a pneumatic control relay for mounting to the combine and pneumatically and operably connected to the pneumatic sensor bulb;
   c. means supplying compressed air to the pneumatic control relay; and
   d. a pneumatic actuator cylinder for mounting to the combine and operably connected to the damper for moving the damper, and operably and pneumatically connected to the pneumatic control relay whereby the pneumatic sensor bulb response to the temperature of the air passing the sensing bulb controls the pneumatic control relay, which in turn actuates the actuator cylinder and moves the damper.

5. A controlled, crop drying attachment for a combine as recited in claim 1 wherein the means controlling the temperature of the air blown into the combined crops in the hopper further comprises:
   a. a source of electrical energization for the temperature control means;
   b. a temperature controller including a bimetallic temperature sensing element and a temperature rise switch and a temperature drop switch mounted in the closed end duct, the bimetallic element actuating the temperature rise switch when the temperature of the air passing the bimetallic element rises and the bimetallic element actuating the temperature drop switch when the temperature of the air passing the bimetallic element drops;
   c. a reversible electric motor for mounting to the combine;
   d. motor linkage operably connecting the motor and the damper for moving of the damper by the motor;
   e. a motor reverse control relay electrically connected to the motor and temperature rise switch to energize the motor in a reverse direction to open the damper when the temperature of the air passing the bimetallic element rises;
   f. a motor forward control relay electrically connected to the motor and temperature drop switch to energize the motor in a forward direction to close the damper when the temperature of the air passing the bimetallic element drops;
   g. a motor reverse limit switch for mounting to the combine and actuated by the motor linkage and electrically connected to the motor reverse control relay to deenergize and limit movement of the motor in a reverse direction; and
   h. a motor forward limit switch for mounting to the combine and mechanically actuated by the motor linkage and electrically connected to the motor forward control relay to deenergize and limit movement of the motor in a forward direction whereby the bimetallic element controls the position of the damper so that the ambient air and heated air mixture ratio is controlled, thereby controlling the temperature of the air blown into the combined crops.

6. A controlled, crop drying apparatus as recited in claim 3 wherein the means controlling the temperature of the air blown into the combined crops in the hopper further comprises:
   a. an electric solenoid for mounting to the combine and connected to the linkage; said solenoid overriding the expandable, gas filled sensor to facilitate the unloading of the combined crops from the hopper;
   b. means for energizing the electric solenoid;
   c. a manual electric solenoid switch for mounting in the cab and electrically connected to the electric solenoid for energizing the electric solenoid;
   d. a binlevel electric solenoid switch for mounting in the hopper at a predetermined level and electrically connected to the electric solenoid to energize the electric solenoid when the crops reaches a predetermined level in the hopper.

7. A controlled, crop drying apparatus as recited in claim 4 wherein the means controlling the temperature of the air blown into the combined crops in the hopper further comprises:
   a. means for supplying compressed air to the pneumatic control relay either selectively from a combine cab or when the combined crop reaches a predetermined level in the hopper so that the pneumatic control relay actuates the pneumatic actuator cylinder to open the damper to supply ambient air to the combined crops to cool the combined crops in the hopper before unloading.

8. A controlled, crop drying apparatus as recited in claim 4 wherein the means controlling the temperature of the air blown into the combined crops in the hopper further comprises:
   a. means for heating the pneumatic sensor bulb either selectively from a cab portion of the combine or when the crop reaches a predetermined level in the hopper so that the pneumatic control relay actuates the pneumatic actuator cylinder to open the damper to supply ambient air to the combined crop in the hopper to cool the combined crops in the hopper before unloading.

9. A controlled crop drying attachment for a combine as recited in claim 5 wherein the means controlling the temperature of the air blown into the combined crops in the hopper further comprises:
   a. a manual electric cooling switch for mounting in a cab portion of the combine and a binlevel electric cooling switch for mounting in the hopper at a predetermined level, the manual switch and binlevel cooling switch being connected in series with the temperature drop switch and motor forward relay and parallel series with the motor reverse relay, whereby upon actuation of the manual switch or actuation of the binlevel switch by the combined crop reaching the predetermined level, current is interrupted to the motor forward relay and current is supplied to the motor reverse relay to open the damper and to supply ambient air to the combined crops in the hopper thereby cooling the crops prior to the unloading of the same.

10. In an agricultural combine having an operating engine and a hopper receiving and storing harvested crops therein, a dryer for said harvested crops, said dryer comprising:
   a. a heat exchanger operatively connected to said engine and receiving waste heat therefrom;
   b. a blower operatively connected to said heat exchanger and drawing ambient air through said heat exchanger;
   c. power means driving said blower;
   d. a duct operatively connected to said blower and having a portion thereof mounted deeply within said hopper; said duct portion having discharge openings therein whereby said ambient air is heated by said heat exchanger and transmitted through said discharge openings by said blower, thereby drying the harvested crops disposed within said hopper; and
   e. means controlling the temperature of the air blown into said crops, said temperature controlling means comprising:
      1. a heat exchanger duct connecting said heat exchanger and said blower and having an opening to the ambient air therein;
      2. a damper pivotally mounted within said heat exchanger duct and movable between a position closing said opening wherein a full flow of heated air is transmitted through said heat exchanger duct, and a position fully opening said opening wherein the heated air flow is blocked; and
      3. means controlling the position of said damper in response to the temperature of the air flowing through said discharge openings.

* * * * *